United States Patent [19]

Adams et al.

[11] Patent Number: 4,536,646
[45] Date of Patent: Aug. 20, 1985

[54] TIME ACCOUNTING SYSTEM

[75] Inventors: C. Harris Adams, Culver City; Robert P. Farnsworth, Los Angeles, both of Calif.

[73] Assignee: Celedata Corporation, Culver City, Calif.

[21] Appl. No.: 505,087

[22] Filed: Jun. 16, 1983

[51] Int. Cl.³ .............................................. G06K 7/10
[52] U.S. Cl. .............................. 235/377; 340/825.15; 364/569; 377/14
[58] Field of Search ................... 364/551, 569; 377/13, 377/14, 15, 16; 340/825.15, 573; 235/376, 377

[56] References Cited

U.S. PATENT DOCUMENTS

| | | |
|---|---|---|
| 3,626,380 | 12/1971 | Griffin . |
| 3,648,243 | 3/1972 | Wiggins . |
| 3,665,165 | 5/1972 | Strandberg et al. ................... 377/13 |
| 3,736,409 | 5/1973 | Boyan . |
| 3,806,705 | 4/1974 | Reilly et al. . |
| 3,878,371 | 4/1975 | Burke ................................. 377/16 X |
| 3,894,215 | 7/1975 | Lotter et al. . |
| 3,932,730 | 1/1976 | Ambrosio . |
| 4,005,412 | 1/1977 | Leander . |
| 4,011,434 | 3/1977 | Hockler . |
| 4,038,535 | 7/1977 | Aldridge et al. . |
| 4,089,056 | 5/1978 | Barna et al. ......................... 364/551 |
| 4,180,206 | 12/1979 | Takahashi et al. . |
| 4,188,618 | 2/1980 | Weisbart . |
| 4,195,220 | 3/1980 | Bristol et al. ......................... 377/13 |
| 4,270,043 | 5/1981 | Baxter et al. . |
| 4,323,771 | 4/1982 | Chalker et al. . |
| 4,333,085 | 6/1982 | Witts . |
| 4,345,147 | 8/1982 | Aaron et al. . |

FOREIGN PATENT DOCUMENTS 52-64248  5/1977  Japan .
2013384  8/1979  United Kingdom ................ 235/377

Primary Examiner—David L. Trafton
Attorney, Agent, or Firm—Poms, Smith, Lande & Rose

[57] ABSTRACT

A system for generating data for input to a computer representing the length of time the worker has spent at a workstation performing a task includes portable memory circuit, a data entry circuit, and a data reading circuit. The memory circuit stores data relating to the task. The data entry circuit is located at the workstation and is adapted to electrically connect to the memory circuit and automatically and periodically writes into the memory circuit data program into the entry circuit which relates to the task at the workstation. The data reading circuit is electrically connected to the computer and is also adapted to electrically connect to the circuit. The data reading circuit transfers into the computer the data written into the memory circuit by the data entry circuit. Accordingly, while the worker is at the workstation, the data entry circuit periodically automatically writes data into the memory circuit, the number of times the data is written into the memory circuit corresponding to the duration of time the worker has spent at the workstation. When the memory circuit is connected to the data reading circuit, all the data in the memory circuit is transferred into computer.

12 Claims, 4 Drawing Figures

TIME ACCOUNTING SYSTEM

FIELD OF THE INVENTION

The present invention relates generally to electronic systems for time accounting, and more specifically to systems which monitor the amount of time an employee has spent at a workstation performing a task and which input this information to a computer.

BACKGROUND OF THE INVENTION

It is especially important in job accounting for manufacturing operations to keep an accurate tabulation of the amount of time an employee has spent at a workstation performing a particular job. Many systems have been proposed to do this task. Some of them, such as those proposed in U.S. Pat. Nos. 3,626,380 and 4,323,771 are essentially electronic time clocks, which translate the time of day onto some type of recording medium or to a computer in response to an employee-initiated operation, such as the insertion of an employee badge into the system. Other systems, such as that proposed in U.S. Pat. No. 4,333,085 are "stand alone" electromechanical systems which utilize computer data cards to record the time of day at which an employee begins and ends a certain task.

The basic element involved in prior art systems is that they record the time of day at which an employee "clocks in" and "clocks out" at a particular task or workstation. At least partially as a result of having to convert all the time of day information into the total amount of time the employee has been at the task, these systems are quite complicated.

There is a need for a simple system, both from a conceptual standpoint and from a hardware standpoint, to keep track of the time which a worker spends at a task. It would be especially helpful if a worker could maintain a device in his possession which could be easily transported from workstation to workstation to record the total amount of time he has spent at all his tasks over a period of days. Such a system would not only have application for manufacturing activities, but also in time recordation for various professions.

Accordingly, it is the principal object of the present invention to accurately determine the length of time a worker has spent at a workstation.

It is another object of the present invention to determine this amount of time in a manner not involving the successive recordation of the times of day.

Yet another object of the present invention is to determine that amount of time in a simple and inexpensive manner.

A further object of the present invention is to record on a device easily transportable by a worker the duration of time that worker has spent at all of the tasks he has performed over a series of days.

SUMMARY OF THE INVENTION

The present invention, in a broad aspect, provides a system for generating data for input to a computer representing the length of time a worker has spent at a workstation performing a task. The system includes a portable memory circuit, a data entry circuit, and a data reading circuit. The portable memory circuit stores data relating to the task. The data entry circuit is located at the workstation and is adapted to electrically connect to the portable memory circuit. The data entry circuit automatically and periodically writes into the memory circuit preprogrammed data relating to the task at the workstation. The data reading circuit is electrically connected to the computer and is also adapted to electrically connect to the memory circuit. The data reading circuit transfers into the computer the data written into the memory circuit by the data entry circuit.

With this system, the memory circuit is connected to the data entry circuit while the worker is at the workstation, and the data entry circuit automatically and periodically writes the programmed data into the memory circuit. The number of times the data is written into the memory circuit corresponds to the duration of time the worker has been at the workstation. The memory circuit is thereafter connected to the data reading circuit, whereupon all the data in the memory circuit is transferred to the computer to indicate the length of time the worker has spent at the workstation.

In accordance with another aspect of the invention, a method for determining the time duration a worker has spent at a workstation is presented which includes periodically and automatically writing data which identifies the task into a portable memory circuit while the worker performs the task. The number of times the data is written into the memory represents the amount of time the worker has spent performing the task.

Accordingly, with the foregoing invention it is unnecessary to record the time of day as part of the determination of the time the worker has been doing his task. The worker simply carries the portable memory circuit from workstation to workstation and at the end of the week all the circuits are collected and the information within is retrieved for processing.

Other objects, features, advantages of the foregoing invention become apparent from the consideration of the following detailed description and the accompanying drawings.

DETAILED DESCRIPTION

Figure 1:
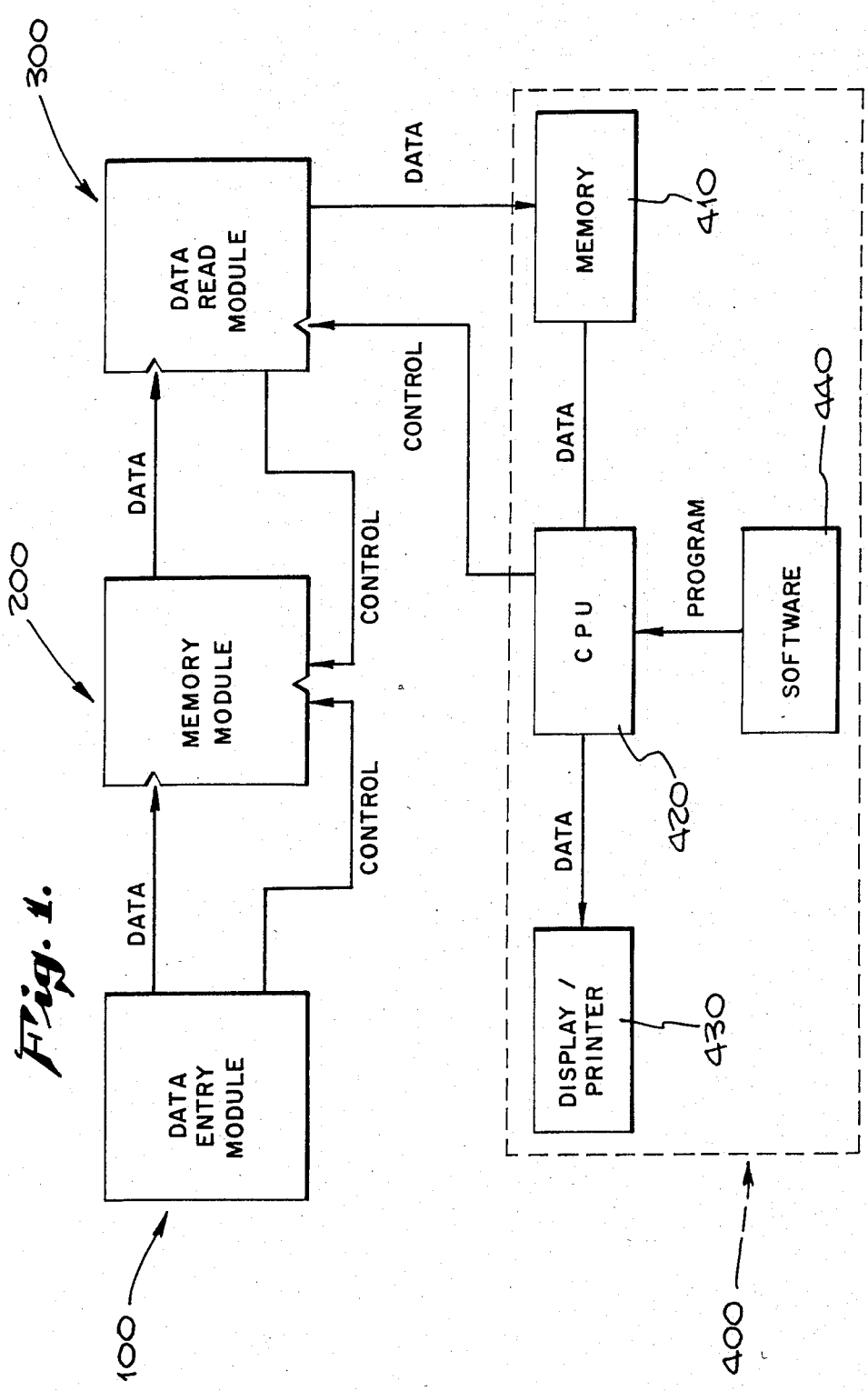
FIG. 1 shows block diagram of a system, according to the present invention, for generating data for input to a computer representing the length of time a worker has spent at a workstation performing a task.

Referring more particularly to the drawings, FIG. 1 shows a block diagram of a system according to the present invention for generating data to be input to a computer system 400 representing the length of time a worker has been at a workstation performing a task. The system includes a data entry module or circuit 100, a memory module or circuit 200, and a data read module or circuit 300. The data entry module 100 is located at the workstation and transfers data and control information into the memory module 200 which is carried by the worker and maintained engaged with the data entry module 100 while the worker is at the workstation. The memory module 200 is designed to collect information for a period of days relating to different workstations at which the employee has worked. At the end of this time, the memory module is inserted into the data read module 300 and data flows from the data read module into the computer system 400. The data read module 300, like the data entry module 100, transfers control signals into the memory module. The data read module operates under the control of the computer system 400, which is not part of the present invention.

The computer system 400 may be any standard computer consisting of a central processing unit 400, a memory 410, appropriate software 440, and a printer/display 430. The computer system processes the information transferred into the computer memory 410 from the memory module and does various processing necessary to sort the data by workstation and by the worker and present the results in a usable format.

The feature of writing and storing data in an incremental fashion in the memory module over a long period of time and later reading it over a short period of time into the computer and thereafter processing the data such as the various increments are summed to account for the total period of time in which the data was recorded is neither taught or suggested by the prior art.

Figure 2:
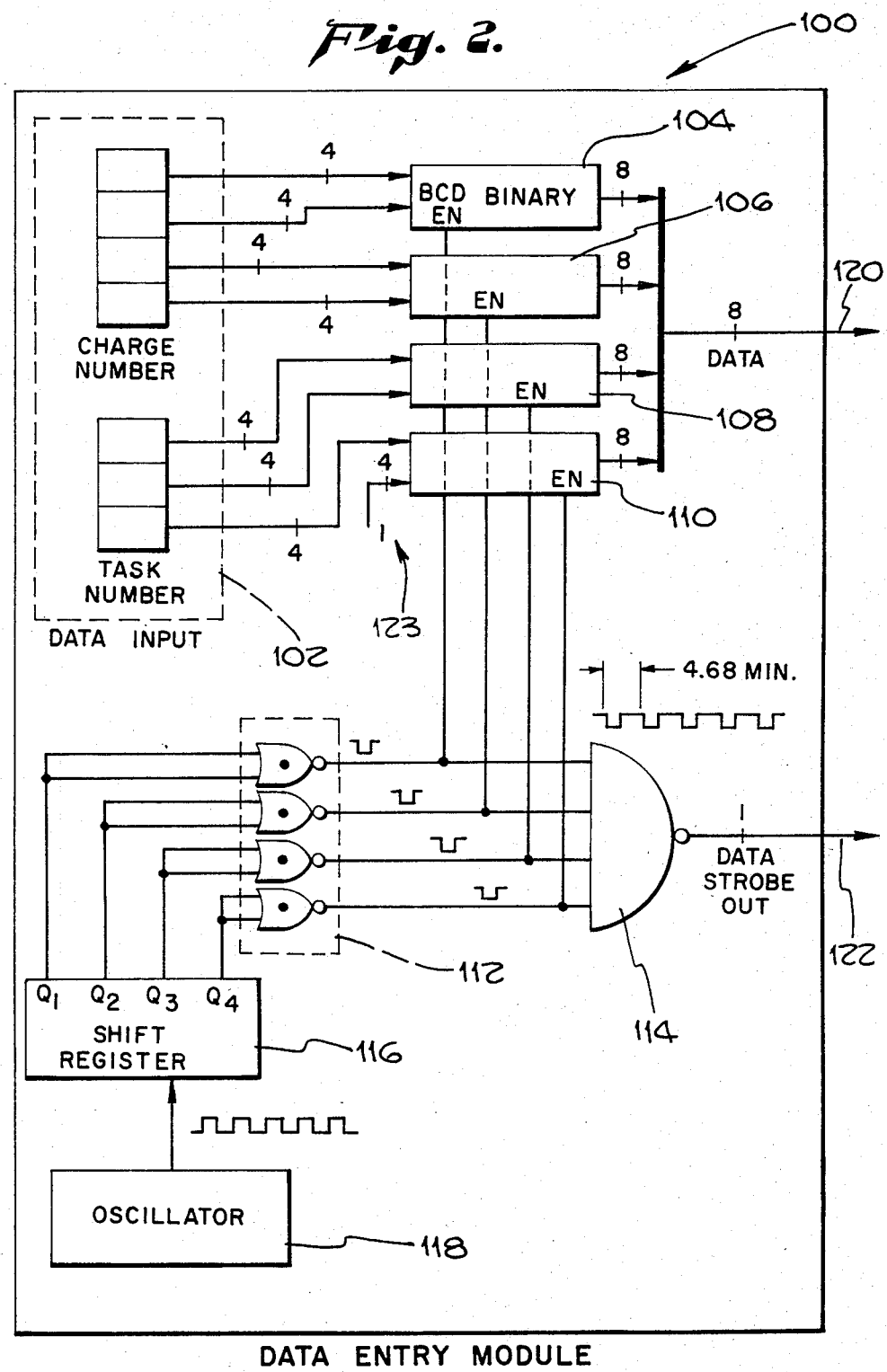
FIG. 2 shows a schematic diagram of the data entry circuit portion of the system shown in FIG. 1.

FIG. 2 is a schematic diagram of the data entry module 100 shown in FIG. 1. The data entry module 100 includes a data section 102 having programmable data relating specifically to the workstation, such as the charge number and task number to be performed. The programmable data can be a read only memory chip, or a series of switches such as thumbwheel switches. In FIG. 2 a series of thumbwheel switches have been shown, each of which present a 4-digit binary-decimal-coded (BCD) information. Thumbwheel switches are particularly attractive for the present invention as they allow a charge number and task number to be simply "dialed" into the data entry module 100. Attached to the data section 102 are a series of BCD-to-binary decoders 104, 106, 108, and 110 which translate the programmed BCD data into a purely binary format. It is this binary data which is repetitively and automatically recorded into the memory module 200 by the data memory module 100. The number of times this information is recorded into the data entry module represents the total amount of time the worker has spent at the workstation. The BCD-to-binary decoders are standard components known in the art and, for example, may be a type 74LS244 integrated circuit. Each of these decoders produce an 8-bit output. It is to be understood, however, that the decoders are not necessary if the programmed data 102 is in binary format originally.

The control logic for the data entry module 100 comprises an oscillator 118 driving a recirculating shift register 116. The shift register circulates one bit and is connected to a series of exclusive NOR gates which produce, as shown in FIG. 2, a sequential series of four pulses. The shift register and exclusive NOR gates may be type CD4015 and CD4077 respectively. The oscillator 118 may be a 14 stage ripple carry binary/counter oscillator type CD 4060. The frequency of the oscillator is set such that the four pulses are spaced 4.68 minutes apart (which represents $60Hz/2^{14}$ power).

The four pulses produced at the output of the exclusive NOR gates are used to drive the "enable" inputs of the BCD-to-binary decoders 104, 106, 108, 110. Each of these decoders has, as mentioned, an 8-bit output, and each of the outputs is driven by appropriate buffer circuitry, sometimes referred to as "tri-state" circuitry, to allow the outputs to be tied together to form an 8-bit data bus. The enabling of each of these decoders 104, 106, 108, 110 by the appropriate pulse puts the 8 bits of that decoder to the Data Output 120 of the data entry circuit 100.

The four data pulses produces at the output of the exclusive NOR gate are summed in a NAND gate 114, which may by type 74LS20. The output of the NAND gate 114 is thus a data strobe having an interval of 4.68 minutes between each of the pulses. This strobe is presented at the Data Strobe Output 122.

As seen from the foregoing, the output of the data entry circuit 100 is the programmed data from the data section 102 broken up into 8-bit groups and presented at the Data Output 120 every 4.68 minutes. Coincident with that data is the data strobe. It should be understood that the 4.68 minute strobe is an arbitrary number chosen and is in no way critical to the invention. The basic concept in the system lies in the repetitive presentation at the output of the data entry module of the data program into the module. The shorter the time between pulses the more time this data will be presented and vice-versa. An interval close to five minutes is advantageous as it results in only twelve updates per hour which reduces the amount of memory capacity necessary in the memory module 200.

It should be noted that the memory module is also provided with a 4-bit flag 123 of logical ONE information which is presented along with the other programmed information. This "flag" is used to indicate to the computer system each cycle of presenting the data programmed into the data entry module at the output thereof.

Mechanically, the output of the data entry module 100 containing the Data and Data Strobe Outputs 120 and 122, respectively, may be any type of connector designed to receive a mating connector, such as the edge of a printed circuit board.

Regarding the memory module 200, it is provided with four primary inputs, Data Input 212, a Strobe Input 214, a Reset Input 216, and a Write Disable Input 218. The Data Input 212 is designed to connect to the Data Output 120 of the data entry module 100. The Strobe Input 214 is designed to connect either with the Data Strobe Output 122 of the data entry module 100 or with the Data Strobe Output 314 of the read module 300, which is be discussed below.

The memory module 200 is a small battery-powered device which is carried by the employee to each of his workstations and which receives the data generated by the data entry module. The 8-bit data segments produced by the data entry module 100 enter a series of 8 Random Access Memories (RAM), two of which 202 and 204 have been shown. In a prototype of the invention, each of these memories was a 4096×1 bit memory. With these memories, approximately 78 hours of employee information could be collected. This memory length is not critical and a different memory configuration could be used.

The memories may be type 5504 memories. Each of these memories has a data input, a data output, a write enable input, a chip enable input, and an address input.

The addresses of the memories are incremented by a 12-bit counter 208 which is driven by the data strobe from the data entry module when data is being written into the memory. A 12-bit counter 208 is used to be compatible with the 12-bit address input of each of the memories. The counter may be a type 4040 counter.

The write enable inputs of each of the RAMS is tied through a resistor to ground to put the RAMS in a writing mode. The strobe from the Data Strobe Output 122, in addition to incrementing the counter 208, is also delayed by a standard R-C circuit 206 and drives the chip enable input of each of the RAMS. The strobe thus both increments the address at the address inputs of the RAMS and writes the data into the RAMS.

The data outputs of the eight RAMS are all brought together to form a 8-bit data bus which is the RAM Data Output 220 of the memory module 200.

Figure 3:
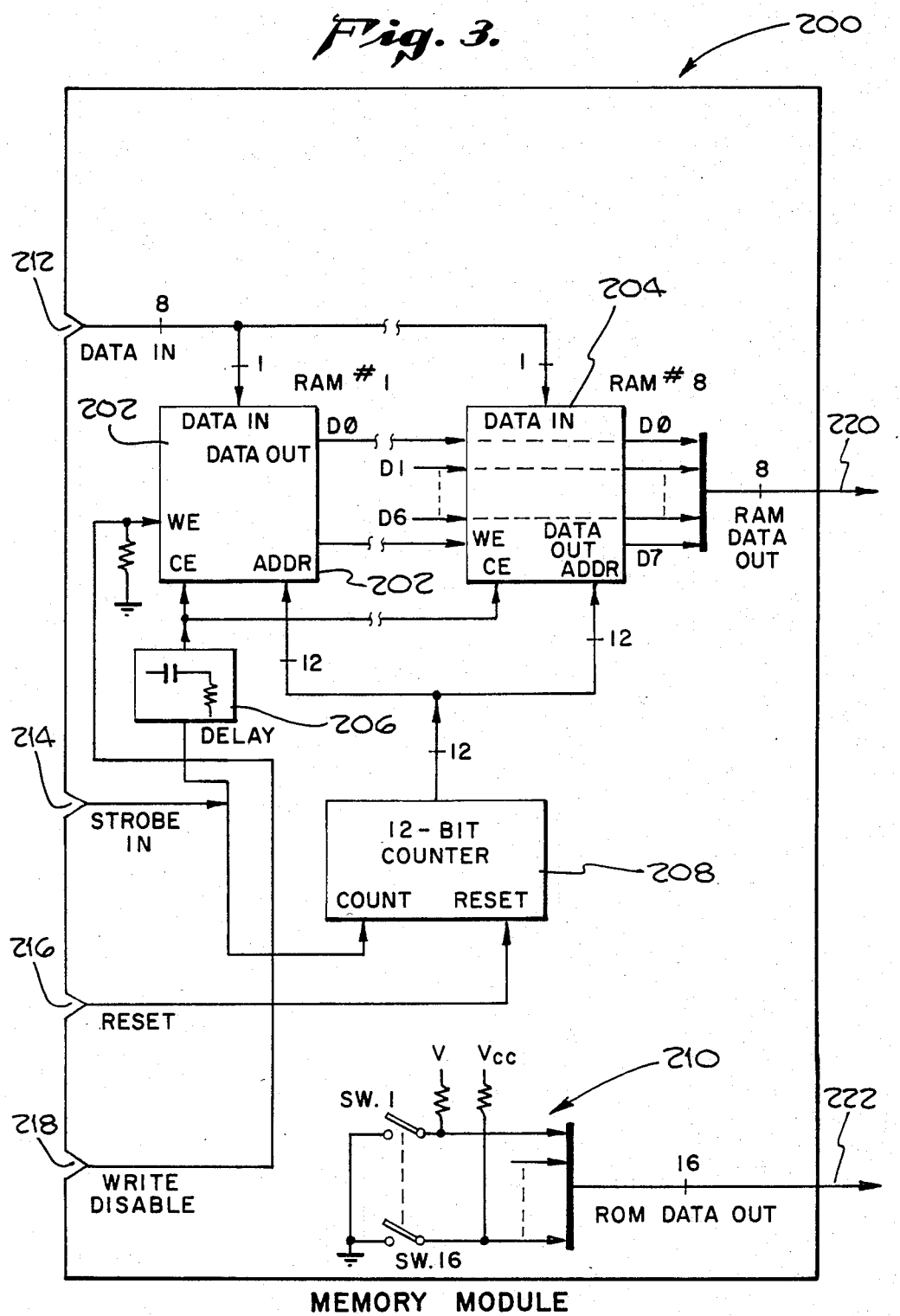
FIG. 3 shows a schematic diagram of the memory circuit portion of the system shown in FIG. 1.

The memory module 200 also contains a Read Only Memory (ROM) 210 which has been shown in FIG. 3 as a series of switches producing either a logical ONE or a logical ZERO output. The ROM 210 is designed to be encoded with an appropriate employee code such that the memory is personalized to the individual employee. In practice, the ROM 210 could be either a series of "dip" switches or an actual read only memory chip plugged into a circuit board. The ROM 210 has been shown in FIG. 3 to have 16 output lines to contain the appropriate employee information. The 16 bits of information form the ROM Data Output 222 of the memory module.

The data read module 300 is shown in FIG. 3. The read module has a RAM Data Input 310, a ROM Data Input 312, a Computer Control Input 322, a Computer Data Output 312, as well as a Data Strobe Output 314, a Reset Output 316, and a Write Disable Output 318. When the memory module 200 is plugged into read module 300, the RAM Data Output 220 of the memory module 200 connects with the RAM Data Input 310 of the read module 300. Likewise, the RAM Data Output 222 of the memory module 200 connects to the RAM Data Input 312 of the read module 312.

Mechanically, both the RAM Data Input 310 and the ROM Data Input 312, as well as the Data Strobe Output 314, Reset Output 316 and the Write Disable Output 318 can be made with connectors adapted to electrically connect to the memory module 200 when the memory module is plugged therein. As mentioned, such connectors may be made with edge connectors of printed circuit boards. The various input and output connections to the memory module 200 are made with connectors which mate to the connectors on the read module 300 and data entry module 100.

The read module 300 contains a logic section 302, comprised of logic circuitry as known in the art which is adapted to communicate with the computer system 400 discussed previously. The computer system 400 inputs a series of control signals 322 to the logic circuit 302. The logic circuit generates a strobe at the Data Strobe Output 314, a reset signal at the Reset Output 316, and write disable signal at the Write Disable Output 318, all of which connect to the memory module. The Data Strobe Output 314 connects to the Data Strobe Input 214 of the memory module 200. The Reset Output 316 connects to the Reset Input 216 of the memory module, and the Write Disable Output 318 connects to the Write Disable Input 218 of the memory module.

Under control of the computer, the logic circuit 316 first resets the counter 208 to the initial memory address for the eight ROMS. The write disable signal is also brought high to remove the RAMS from a "write" mode. A series of quick pulses is then generated over the Data Strobe Output to increment the counter 208 to the range of addresses for all of the data in the RAMS. This causes the contents of the RAMS to be generated at the RAM Data Output 220 of the memory module and to be presented at the input of one 304 of three data buffers 304, 306, and 308, the outputs of which are all tied together to form a 8-bit data bus. During this time, the logic circuit generates a signal enabling this particular buffer 304 such that the data passes from the RAM data input 310 to the Computer Data Output 320 for transfer into the computer. The logic circuit also generates a flag signal 324 to the computer upon receipt of each 8-bit data segment to indicate to the computer the presence of new information at the computer data input 320.

After the RAMS have been read and their contents transferred to the computer, the logic circuit 302 next sequentially enables the two 8-bit buffers 306 and 308 driven by the ROM Data Input 312 which connects to the ROM Data Output 222 of the memory module. The two 8-bit groups of ROM data are then transferred to the computer 400 over the Computer Data Output 320. Appropriate data ready flags 324 are also generated to the computer.

After the ROM data has been read, the write disable signal 318 is set to a low condition, the reset signal 316 is again activated to reset the address counter 208, and a series of pulses is generated over the Data Strobe Output 314 to increment the counter 208 through all possible addresses. As no data is present at the data input 212, this causes the eight RAMS to be erased, as it is being written full of ZEROS.

The data buffers 304, 306, and 308 may be were type 74LS244 integrated circuits.

Figure 4:
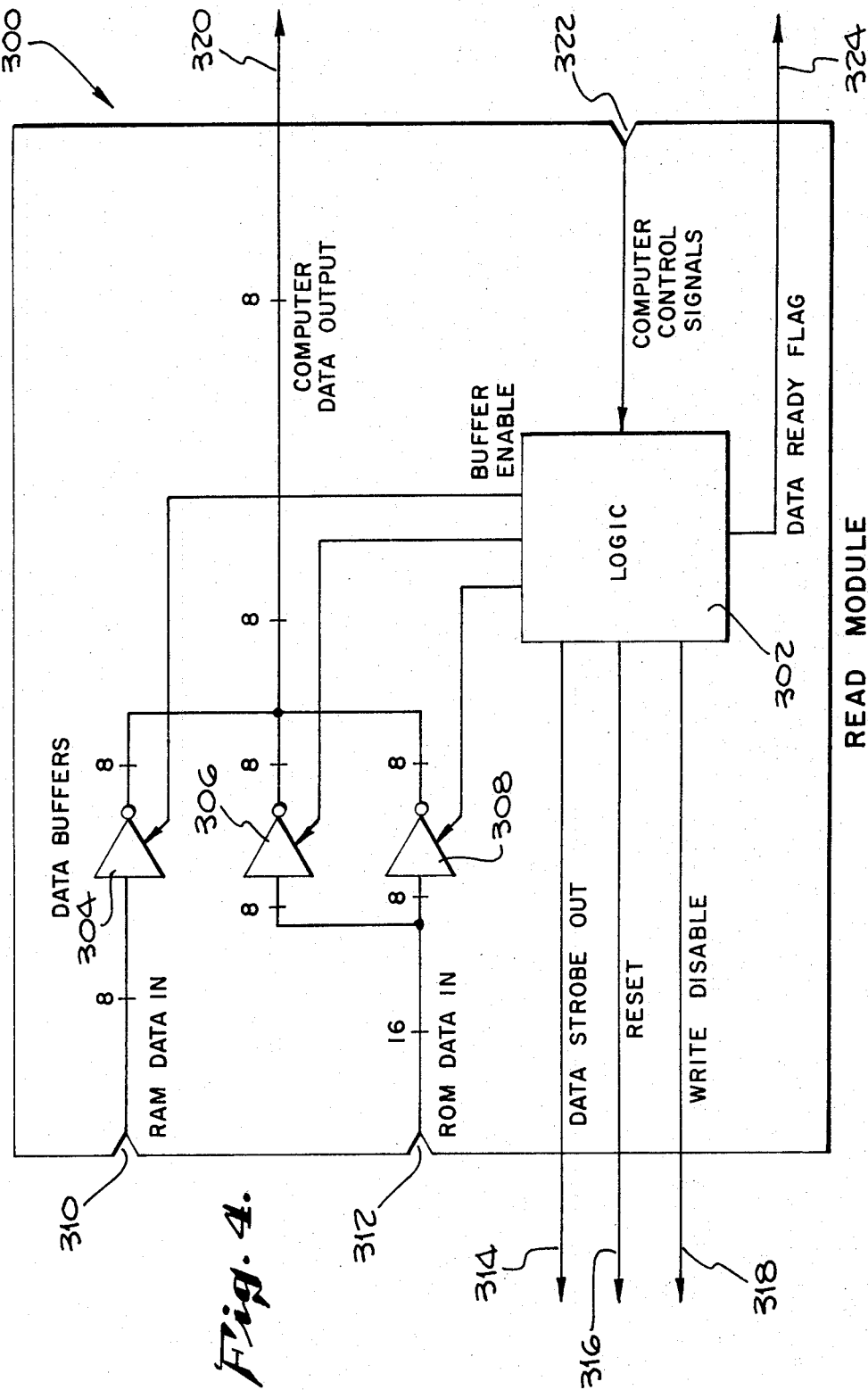
FIG. 4 shows a schematic diagram of the data reading circuit portion of the system shown in FIG. 1.

The logic circuit in a prototype of the invention used consisted of three flip-flops and several small scale integrated circuits such as AND gates and OR gates which interfaced with the control signals generated by an Apple Computer to generate the various signals shown in FIG. 4. This logic has not been shown in FIG. 4 as it will vary depending upon the requirements of the computer 400 to which the read module 300 is interfaced.

As seen from the foregoing, the present invention provides a unique apparatus and method for recording the time a worker spends doing a given task which requires only that the worker insert the memory module 200 into the data entry module 100 while he is performing the task and then plug the memory module 200 into the data read module 300 at the end of the week whereupon all of the information relating to the various tasks he has performed at various workstations over the past week are entered into the computer and the appropriate job accounting processing is performed. The circuitry to accomplish this is extremely simple and is does not involve, as does the vast majority of the prior art, the recording of the time of day. In the prototype of the invention constructed, the memory module was not much larger than a pack of cigarettes. The underlying principle for the invention, namely, the repetitive and automatic recording of data programmed into the data entry module, is what makes the invention possible.

In the foregoing description of the present invention, a preferred embodiment of the invention has been disclosed. It is to be understood that various other design modifications are within the scope of the invention and thus that the invention is not limited to the particular arrangement which has been disclosed and described in detail herein.

What is claimed is:

1. A system for generating data for input to a computer representing the length of time a worker has spent at a workstation performing a task, comprising:

portable memory circuit means for storing preselected and non-changing data relating to said task;

data entry circuit means, located at said workstation and adapted to electrically connect to said memory circuit means, for automatically and periodically writing into said memory circuit means data programmed into said entry circuit means relating to said task at said workstation; and data reading circuit means, electrically connected to said computer and adapted to electrically connect to said memory circuit means, for transferring into said computer said data written into said memory circuit means by said entry circuit means, whereby said memory circuit means is connected to said entry circuit means while said worker is at said workstation, said entry circuit means periodically and automatically writing said data into said memory circuit means, the number of times said data is written into said memory circuit means corresponding to the duration of time said worker has spent at said workstation, said memory circuit means thereafter being connected to said reading circuit means, whereupon all of said data in said memory circuit means is transferred into said computer system to indicate the length of time said worker has spent at said workstation.

2. A system for generating data for input to a computer representing the length of time a worker has spent at a workstation performing a task, comprising:
(a) portable memory circuit means for storing data relating to said task, said portable memory circuit means including:
1. random access memory means for receiving data, said random access means having data input means and data output means for transferring data into and out of said random access memory means;
2. read only memory means for storing predetermined data representing said task at said workstation; and
3. address generator means, connected to the address inputs of said random access memory means and externally incrementable for defining the addresses in said random access memory means at which data is transferred into and out of said random access memory means;
(b) data entry circuit means, located at said workstation and adapted to electrically connect to said data input means and said address generator means, for controlling said generator means and for automatically and periodically writing into said random access memory means said predetermined data in said read only memory means; and
(c) data reading circuit means, electrically connected to said computer and adapted to electrically connect to said data output means and said address generator means, for controlling said generator means to read out said data written into said random access memory means and for transferring said data, into said computer whereby said memory circuit means is connected to said entry circuit means while said worker is at said workstation, said entry circuit means periodically and automatically writing said data into said memory circuit means, the number of times said data is written into said memory circuit means corresponding to the duration of time said worker has spent at said workstation, said memory circuit means thereafter being connected to said reading circuit means, whereupon all of said data in said memory circuit means is transferred into said computer system to indicate the length of time said worker has spent at said workstation.

3. A system as defined in claim 2, wherein said data entry circuit means comprises:
programmable data means for defining information relating to said task at said workstation;
digital converter circuit means, connected to said programmable data means and connectable to said portable memory circuit means, for converting said information at said programmable data means to a plurality of multibyte binary quantities for writing into said portable memory circuit means;
oscillator means for generating a periodic wavetrain;
shift register means, connected to said oscillator means, for sequentially enabling said plurality of multibyte binary quantities at the output of said digital conversion circuit means to said memory circuit means at intervals defined by said oscillator means; and
data strobe generator means, connected to said shift register means and connectable to said memory circuit means, for periodically and automatically strobing said multibyte data into said memory circuit means.

4. A system as defined in claim 1, where said data reading circuit means comprises:
buffer means, connected to said computer and connectable to said memory circuit means, for buffering said data to said computer;
logic circuit means, connected to said computer and connectable to said memory circuit means, for enabling said buffer means, for generating a data strobe to strobe said data out of said memory circuit means and into said computer, for clearing said memory circuit means, for indicating to said computer when said data from said memory circuit means is ready to be read by said computer, and for preventing data from being written into said memory circuit means while said data is being read into said computer.

5. A system as defined in claim 2, wherein said read only memory means comprises a plurality of selectable switch means.

6. A system as defined in claim 3, wherein said programmable data means comprises a plurality of read only memories.

7. A system as defined in claim 3, wherein said programmable data means comprises a plurality of switch means.

8. A system as defined in claim 3, wherein said data entry circuit means further comprises flag means for providing a data marker in said information.

9. A method for generating data for input to a computer representing the length of time a worker has spent at a workstation performing a task, comprising:
providing said worker with a portable memory circuit;
providing a data entry circuit at said workstation adapted to connect to said portable memory circuit;
providing a data reading circuit connected to said computer and adapted to connect to said portable memory circuit;
having said worker maintain said portable memory circuit connected to said data entry circuit while performing said task;

automatically and repetitively writing preselected and non-changing data identifying said task into said portable memory circuit with said data entry circuit at regular intervals when said portable memory circuit is connected to said data entry circuit, the number of times said data is written into said portable memory circuit corresponding to the amount of time said worker has spent at said workstation; and connecting said portable memory circuit to said data reading circuit and reading said data stored in said portable memory circuit into said computer.

10. A method for determining the duration of time which a worker spends at a workstation performing a task, comprising:

periodically and automatically writing at said workstation preselected and non-changing data identifying said task into a portable memory circuit carried by said worker while said worker performs said task, the number of times said data is written into said portable memory circuit representing the amount of time said worker has spent performing said task.

11. In a system for recording the amount of time a worker has spent at a workstation performing a task, a portable memory circuit in which data representing said time is recorded, comprising:

random access memory means for receiving data written therein at said workstation at regular intervals relating to the amount of time said worker has spent performing said task;

read only memory means for containing an identification of said worker;

address generator means for generating addresses for said random access memory means to enable data to be written into and read out of said random access memory means; and circuit means for erasing the contents of said random access memory means, whereby said data relating to said task is written into said random access memory means periodically while said worker is at said workstation, the contents of said random access memory means and said read only memory means thereafter being read out of said portable memory circuit to identify said worker and the amount of time said worker has spent performing said task.

12. A system for recording the amount of time a worker has spent at a workstation performing a task comprising:

circuit means for generating and storing preselected and non-changing data identifying said task, the number of times said data is stored representing the length of time said worker has spent at said workstation.

* * * * *